United States Patent [19]
Tambussi

[11] Patent Number: 5,970,590
[45] Date of Patent: Oct. 26, 1999

[54] BURIAL CONTAINERS

[76] Inventor: William C. Tambussi, 13 Greensward, Cherry Hill, N.J. 08002

[21] Appl. No.: 08/949,181

[22] Filed: Oct. 10, 1997

Related U.S. Application Data

[63] Continuation-in-part of application No. 08/645,721, May 14, 1996, abandoned.

[51] Int. Cl.⁶ ................................................. A61G 17/00
[52] U.S. Cl. ........................................... 27/7; 27/10
[58] Field of Search ................................ 27/2, 7, 10, 35, 27/3

[56] References Cited

U.S. PATENT DOCUMENTS

| | | | |
|---|---|---|---|
| 3,627,603 | 12/1971 | Greig | 156/79 |
| 3,657,036 | 4/1972 | Mullenhoff et al. | 156/79 |
| 3,859,401 | 1/1975 | Gallap et al. | 264/45.3 |
| 4,021,388 | 5/1977 | Griffin | 260/13 |
| 4,719,267 | 1/1988 | Rizk et al. | 523/453 |
| 5,471,718 | 12/1995 | Harrill | 27/7 |
| 5,485,661 | 1/1996 | McClure | 27/7 |

*Primary Examiner*—Kien T. Nguyen
*Attorney, Agent, or Firm*—Norman E. Lehrer

[57] ABSTRACT

A burial container comprising a seamless base unit of unitary construction having a bottom, opposing side walls and opposing end walls and a seamless lid unit of unitary construction, said base unit and lid unit being formed of a cured polyurethane resin.

9 Claims, 1 Drawing Sheet

BURIAL CONTAINERS

CROSS-REFERENCE TO RELATED APPLICATION

This application is a continuation-in-part of U.S. application Ser. No. 08/645,721, filed May 14, 1996, now abandoned.

FIELD OF THE INVENTION

The present invention relates to large containers or receptacles that are fabricated from novel resinous materials and, more particularly, to a novel resinous material which is suitable for forming the base and lid of a large container or receptacle such as a burial container for the interment of human or animal remains, the main structural portion of the containers being fabricated as unitary components which are substantially resistant to influences from both within or without.

BACKGROUND OF THE INVENTION

Large containers or receptacles such as burial containers or caskets in common use at the present time are generally bulky structures made of a variety of materials including wood, metal, concrete, synthetic resins as well as composite materials and with covers or lids of various kinds. The method of fabrication heretofore used to manufacture the large size base and lid components is generally complex and expensive, and frequently requires many separate operations and materials to provide the desired resistance to deterioration, sealability and structural characteristics. Prior burial containers made entirely of synthetic resins, while exhibiting some desirable advantages, are generally unsuitable for aesthetic reasons and lack the structural and flexural strength to withstand the loads applied as well as the structural characteristics needed for withstanding handling during storage and transporting, and when being used for the interment of human or animal remains.

Presently composite caskets are fabricated utilizing materials that depend on a chemical reaction to solidify. The materials are resins and hardeners and/or catalysts coupled with reinforcements for strength. Thus, by depending on reinforcements for structural integrity the resins and catalysts are of a low viscosity sufficient enough to flow in and around the reinforcements. To provide proper wetting properties and adhesions to the reinforcements, coupling agents are used to promote adhesion. Systems of this type because of the exothermic reaction, have a high shrinkage rate that results in the structure having built-in thermal stresses. Distortion often occurs following the expansion cycle. Furthermore, systems of this nature do not enjoy quick cycle times without the risk of stress cracking due to thermal cycling associated with the exothermic reaction.

Additionally, it requires sophisticated equipment with high pressures and velocity to fill the molds within the gel times prescribed. If the molds are not filled within the time limits, premature release of the product from the mold surface occurs resulting in surface distortion of the finished part. Material systems of this nature require expensive and complex metering, mixing and dispensing equipment that require solvent flushing. The solvents available for use presently are neither environmentally nor user friendly. Disposal requirements of the materials are permit oriented. Concurrent with this complexity is the requirement to fabricate and use expensive molds. These molds are designed to withstand the high pressures associated with these molding resins.

SUMMARY OF THE INVENTION

It is, accordingly, an object of the present invention to provide an improved large container or receptacle such as a burial container or casket including both the base and lid therefor having the structural strength and resistance to deterioration needed both during storage and when transporting before and after the interment of human and animal remains.

It is a further object of the present invention to provide a burial container wherein the base and lid portions thereof are formed with a unitary and seamless construction from synthetic resin materials, and preferably cured polyurethane resins.

It is another object of the present invention to provide a burial container wherein the base and lid units can be readily handled and transported without structural damage and will withstand structural damage and resist deterioration during use by influences from within or without.

It is yet another object of the present invention to provide a synthetic resin material such as a curable polyurethane which may be used to produce, by simple molding techniques, a large container or receptacle of unitary construction such as the base and lid components of a burial container.

The present invention provides an avenue of technical merit whereby a simple, yet unique, system is employed utilizing the criteria listed below:

1. A low cost-low molecular weight resin system.
2. A low cost filler.
3. Low cost molds.
4. Low cost metering, mixing and dispensing equipment.

The molding resins/fillers and colorant are premixed and gravity fed to the metering, mixing and dispensing equipment where they come in contact with each other via a manifold. The material is pumped through a static/dynamic mixer into composite molds. Once the material has gelled the part has sufficient green strength for removal from the mold. Then the mold surface is treated with a release agent and the cycle starts over.

BRIEF DESCRIPTION OF THE DRAWINGS

For the purpose of illustrating the invention, there shown in the accompanying drawings one form which is presently preferred; it being understood that the invention is not intended to be limited to the precise arrangements and instrumentalities shown.

DETAILED DESCRIPTION OF THE INVENTION

Figure 1:
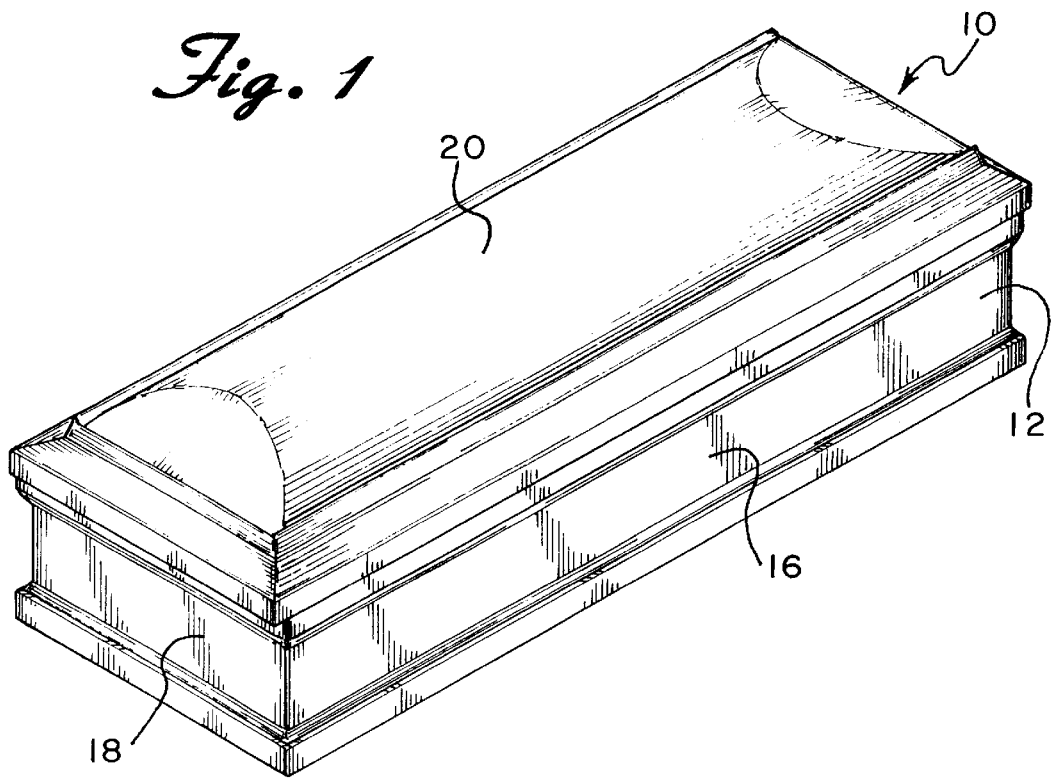
FIG. 1 is a perspective view of a burial container constructed of synthetic resinous materials of the present invention.
Figure 2:
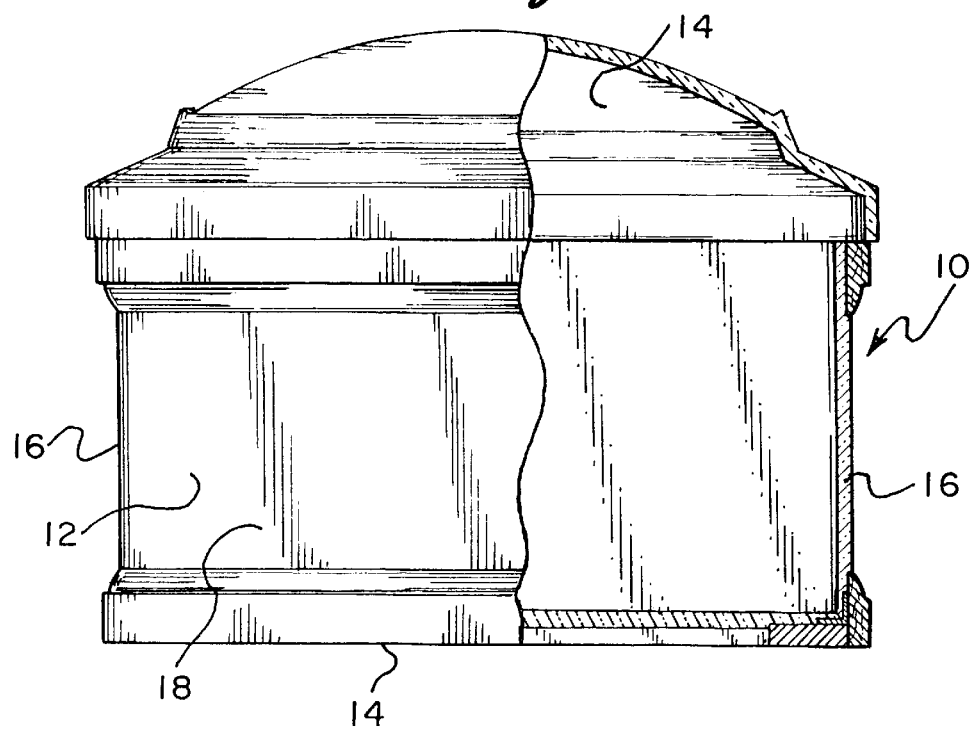
FIG. 2 is an end view, with a portion broken away, of the burial container shown in FIG. 1.

Referring now to the drawings in detail wherein like references numerals designate like parts, there is shown a burial container designated generally as 10 comprising a lower box or base component 12 and an upper lid component 20, which components are both fabricated from a synthetic resin material, preferably a cured polyurethane resin as will be described in detail hereinafter.

The base component 12 comprises a wall portion 13 having opposing side walls 16, opposing end walls 18 and a bottom 14. The wall and bottom portions of the base component 12 are of unitary seamless construction which are formed of a synthetic resin material, preferably of a cured polyurethane resin, which is molded in an appropriately configured mold suitable to provide a unitary seamless base component configuration.

The lid component 20 of the burial container 10 is of a substantially identical construction to that of the base component 12, the lid being of a unitary seamless construction formed of a synthetic resin material molded as a unitary configuration in a suitably configured mold.

The unitary seamless base component 12 and lid component 20 of the burial container 10 fabricated of a synthetic resin material, preferably a cured polyurethane resin as herein described having a wall thickness of about ¼", or thicker as desired, has high structural strength and impermeability to moisture as well as being resistant during use of a burial container to deterioration by influences from within or without. The structural strength of the various components and of the assembled burial container will withstand substantial loads on the outside as well as the walls 13 thereof being resistant to permanent deformation for extended periods under loading of at least 400 pounds or even more. In addition, any of the end portions of the burial container which may not be supported during storage or transportation or when in use will not be permanently deformed. While not shown in the drawings, the base and lid components of the burial container may be covered with fabric or other elements as desired.

As indicated, the unitary seamless base component 12 and lid component 20 of the burial container 10 of the invention are fabricated by molding from a synthetic resin material, and most advantageously from particular cured polyurethane resins. It has been demonstrated that polyurethane resins which are prepared by the combination of particular di and trifunctional polyols herein described reacted with an organic isocyanate of corresponding functionality in combination with an appropriate catalyst, such as metal salts and amines or mixtures thereof will be suitable for use in preparing the base and lid units of the present invention. Polyol resins which are suitable for use in preparation of the polyurethane resin of the invention are polyesters which are, for example, made from ethylene glycol and adipic acid and, preferably, are combinations of particular polyether polyols which are prepared from propylene oxide, ethylene oxide and mixtures of propylene oxide and ethylene oxide.

Suitable polyurethane resins for use in accordance with the invention are prepared from the combination of 5% to 95% by weight, preferably from about 50% to 90% by weight, of polyether polyols having functionality of 2 and from 95% to 5% by weight, preferably from about 50% to 10% by weight of polyether polyols having a functionality of 3, which combination of polyether polyols are reacted with any of a wide variety of known organic diisocyanates such as, for example, commercially available mixtures of MDI and oligomers of MDI.

The organic diisocyanate components should be employed in substantially stoichiometric quantities depending on the functionality and amount of the polyether polyol resins. In general, the amount of isocyanate in the resin system can vary from about 27% by weight of the reaction mixture at a functionality of 2 to about 46% by weight of a functionality of 3, wherein the isocyanate to polyether resin can vary in stoichiometric proportions of from about 1:1 to 1.05:1. In addition, a wide range of metal salt and amine catalysts or mixtures thereof is preferably used in a concentration from about 0.1% to 1% by weight. Exemplary suitable catalysts are TMBDA, (tetramethylbutane diamine), DABCO (1, 4-Diazo (2,2,2) bicyclooctane), DBTDL (dibutyltindilaurate), tin octoate and mixtures thereof. A preferred catalyst system may be a mixture of 0.5% DABCO and 0.1% of DBTDL.

The resin system will cure at an elevated temperature generally in a short time, preferably from at least 1 minute to about 10 minutes or even longer, with the heat generated by the exothermic reaction between the polyol resin and isocyanate being sufficient to effect curing of the resin depending upon the proportion of the resins and organic diisocyanate used and type and amount of catalyst. Thus, the particular resin system employed can also be adjusted based on the molding technique to be employed in fabricating the desired components. It would be evident that the viscosity of the mixture of resins and isocyanate should be low enough to permit thorough mixing of the various ingredients and then transferring the mixture to the mold before the curing reaction has been significantly initiated.

The resin compositions suitable for use in accordance with the invention may also contain a variety of known fillers and extenders and pigments to enhance and modify the properties of the cured product and to adapt the composition with the particular molding process. Typical fillers that are suitable include carbon black, hydrated alumina, carbonates, silicates, silica fillers, hollow micropheres, perlite, vermiculite and the like.

The base and lid components of the large containers or receptacles of the invention, particularly burial containers or caskets, can be fabricated from the polyurethane resin composition of the invention using any one of a variety of known conventional molding processes such as "RIM", "RRIM", "SRIM" and "RTM". While conventional mixing techniques may be employed, a preferred method of mixing the various ingredients may be carried out by first metering out and mixing the resin and isocyanate ingredients with a proportioning pump and then adding the filler and pigment ingredients as a separate stream to the mixing head of the pump. It is also possible to premix the resin and filler components until a substantially homogeneous mixture is formed and then admixing the isocyanate component with the resin premix.

In general, large size base units and lids such as the unitary, seamless components of the burial caskets of the invention can be molded by proportioning pump mixing of the resin components and then casting the mixture into appropriately configured molds, wherein the resins will be cured without the need for applying any additional heat in a short period of time, e.g. about 1 to 5 minutes, or longer if necessary, depending upon the size and complexity of the molds and the time needed to assure that the mold cavity will be completely and uniformly filled.

The polyurethane resin compositions of the invention are of special advantage in providing for ready manufacture of large size unitary, seamless base and lid components of containers or receptacles such as the burial containers of the invention which are strong and will have structural characteristics which withstand many conditions of abuse during storage and transporting as well as during use, and are resistant to deterioration by a wide range of materials from both within and outside the containers. Furthermore, because of the particular resin compositions used with the present invention it is not necessary to foam the same in order to reduce the weight of the finished product or for any other reason. While it is, of course, possible to utilize a foamed resin with the invention, it is presently preferred that the resin be unfoamed.

Urethanes, particularly the aromatic type, will when subjected to UV radiation discolor. They require anti-aging additives to minimize the degradation process. Ultraviolet stabilizers such as TINUVIN 213,571 are used and are commonly available.

A typical formula suitable for use in accordance with the practice of the invention may include the following type and proportions of ingredients:

Polyol A having a functionality of 2–77% by weight

Polyol B having a functionality of 3–23% by weight both polyol A (diol) and polyol B (triol) are polyether polyols prepared by the polymerization of propylene oxide and are available on a commercial basis as a mixture under the trade name ELASTOCAST.

The combination of polyether polyols is mixed in a stoichiometric ration of resin to isocyanate of 100 to 64.9, with a suitable isocyanate typical of which is commercially available isocyanate containing a mixture of pure MDI (45%), polymeric MDI (50%) and mixed isomers of MDI (5%).

A catalyst system consisting of 0.1% tin salt and 0.5% of a hindered amine (Dabeo BL-22 from Air Products) would be suitable for use in the above typical formulation.

Typical suitable fillers for use in such formulation may be hollow micropheres or silica.

| Hardness | 75–90 Shore Durometer D |
| --- | --- |
| Tensile Strength | 6,500 to 7,500 psi |
| Flex Modulus | 210,000 to 250,000 psi |
| Heat Distortion | up to 180° F. |

The foregoing is therefore considered as illustrative only of the principle of the invention. Further, since numerous modifications and changes will readily occur to those skilled in the art, it is not desired to limit the invention to the exact construction and compositions shown and described. All suitable modifications and equivalents that fall within the scope of the appended claims are deemed within the present inventive concept.

What is claimed is:

1. A burial container comprising a seamless base unit of unitary construction having a bottom, opposing side walls and opposing end walls and a seamless lid unit of unitary construction, said base unit and lid unit being formed of a cured polyurethane resin, said cured polyurethane resin being the reaction product of from 5% to 95% by weight of a polyether polyol having a functionality of 2 and from 95% to 5% by weight of a polyether polyol having a functionality of 3 and about a stoichiometric amount of an organic diisoyanate, said burial container being adapted to withstand abuse during storage and use while being resistant to deterioration by chemical and environmental conditions from within and without.

2. The burial container as claims in claim 1, wherein said cured polyurethane resin is the reaction product of from 50% to 90% by weight of a polyether polyol having a functionality of 2 and from 10% to 50% by weight of a polyether polyol having a functionality of 3.

3. The burial container as claimed in claim 2, wherein said cured polyurethane resin is the reaction product of a polyether polyol and an organic diisocyanate and at least 0.1% to about 1% of a catalyst which is a metal salt, an organic polyamine or mixtures of the same.

4. The burial container as claimed in claim 3, wherein said cured polyurethane resin further comprises a filler ingredient.

5. A burial container comprising a seamless base unit of unitary construction having a bottom, opposing side walls and opposing end walls and a seamless lid unit of unitary construction, said base unit and lid unit being formed of an unfoamed cured polyurethane resin, said burial container being adapted to withstand abuse during storage and use while being resistant to deterioration by chemical and environmental conditions from within and without.

6. The burial container as claimed in claim 5, wherein said cured polyurethane resin is the reaction product of from 5% to 95% by weight of a polyether polyol having a functionality of 2 and from 95% to 5% by weight of a polyether polyol having a functionality of 3 and about a stoichiometric amount of an organic diisocyanate.

7. The burial container as claimed in claim 6, wherein said cured polyurethane resin is the reaction product of from 50% to 90% by weight of a polyether polyol having a functionality of 2 and from 10% to 50% by weight of a polyether polyol having a functionality of 3.

8. The burial container as claimed in claim 7, wherein said cured polyurethane resin is the reaction product of a polyether polyol and an organic diisocyanate and at least 0.1% to about 1% of a catalyst which is a metal salt, an organic polyamine or mixtures of the same.

9. The burial container as claimed in claim 8, wherein said cured polyurethane resin further comprises a filler ingredient.

* * * * *